(12) United States Patent
Hansen et al.

(10) Patent No.: US 8,596,666 B1
(45) Date of Patent: Dec. 3, 2013

(54) GROUND ENGAGING MACHINE HAVING ARTICULATION HITCH, AND METHOD

(75) Inventors: Matthew T. Hansen, Big Rock, IL (US); Brian C. Howson, Aurora, IL (US); Christopher Carpenter, Shorewood, IL (US); David R. Shields, Aurora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/477,528

(22) Filed: May 22, 2012

(51) Int. Cl.
*B60D 1/02* (2006.01)
*F16J 1/16* (2006.01)

(52) U.S. Cl.
USPC ........... 280/515; 403/158; 403/150; 403/163; 403/154; 403/151; 403/156

(58) Field of Classification Search
USPC .......... 280/515; 403/158, 150, 163, 154, 151, 403/156
See application file for complete search history.

(56) References Cited

U.S. PATENT DOCUMENTS

| | | | |
|---|---|---|---|
| 3,778,174 A | 12/1973 | Molby | |
| 4,772,150 A * | 9/1988 | Horton | 403/39 |
| 4,815,191 A * | 3/1989 | Garman et al. | 29/434 |
| 5,366,299 A | 11/1994 | Hughes | |
| 5,961,141 A | 10/1999 | Goel | |
| 6,071,033 A | 6/2000 | Neitzel et al. | |

* cited by examiner

*Primary Examiner* — Tashiana Adams
*Assistant Examiner* — Marlon Arce
(74) *Attorney, Agent, or Firm* — Liell & McNeil

(57) ABSTRACT

A ground engaging machine includes a first and a second frame unit, and an articulation hitch coupling together the first and second frame units. The articulation hitch includes a pin, a first and a second bearing positioned about the pin, and abutting a first and a second axial side of an annular protrusion of a hitch plate in one of the first and second frame units. A clamping mechanism of the articulation hitch clamps the first and second bearings between first and second clamping components, such that they are preloaded against the annular protrusion.

18 Claims, 5 Drawing Sheets

GROUND ENGAGING MACHINE HAVING ARTICULATION HITCH, AND METHOD

TECHNICAL FIELD

The present disclosure relates generally to an articulated machine, and more particularly to an articulation hitch for such a machine where bearings are clamped between first and second clamping components and preloaded against an annular protrusion of a machine frame unit.

BACKGROUND

Articulated machines are used in a wide variety of heavy duty applications. In a typical design, such as any one of various wheel loaders used, for example, in construction, mining, forestry, and waste handling, a set of front wheels are coupled with a front frame unit and a set of back wheels are coupled to a back frame unit. The frame units articulate about an articulation axis at one or more articulation joints. An articulation steering system will typically include hydraulic actuators which urge the frame units to rotate about the articulation axis relative to one another. It is common for articulated machines to have very dynamic operation, moving forward and moving back repeatedly, and steering to change the articulation angle between the frame units many times over the course of a work cycle. Due to such general patterns of machine movement, and the otherwise rugged conditions involved in moving material and traveling over rough terrain, the hardware used in articulation joints needs to be fairly robust.

It is therefore common for the components of articulation joints to be relatively large and sturdy, capable of withstanding and transmitting loads in the many thousands of pounds, and rotating back and forth thousands of times over the course of a service life. Lubrication and lubricant sealing systems are also commonly provided in or in association with articulation joints to lubricate various of the components, and extend their service life. As a result of the foregoing and other factors, articulation joints for heavy machinery tend to be significantly more complex, expensive, and precisely engineered than simple hitch constructions.

One articulation joint design is known from U.S. Pat. No. 5,366,299 to Hughes, entitled Articulation Vehicle And Hinge Assembly. Hughes proposes a hinge assembly for front and rear frame portions of an articulated vehicle, where rotatable protruding trunnions join the front and rear frame portions at each one of a pair of vertically aligned hinges. In the trunnion, a spacer ring is placed against one of two bearing cones positioned upon a shoulder of a pin, and is biased against the one of the bearings via an end cap secured to the pin. A plurality of bolts are apparently used to secure the subject end cap to the pin, and apply a preload to the bearing via the spacer. A shim pack is placed between the end cap and the end of the pin to control the preload.

SUMMARY

In one aspect, a ground engaging machine includes a frame having a first frame unit with a first and a second hitch plate defining a first and a second bore, respectively, and a second frame unit having a middle hitch plate positioned between the first and second hitch plates and defining a third bore in register with the first and second bores, and including an annular protrusion extending inwardly into the third bore. The machine further includes an articulation hitch coupling the first and second frame units together, and having a pin defining an articulation axis, and a first and a second bearing, the first and second bearings being positioned about the pin and abutting a first and a second axial side of the annular protrusion, respectively. The pin includes a first end coupled to the first hitch plate, a second end coupled to the second hitch plate, and a first thread. The articulation hitch further includes a clamping mechanism having a first clamping component positioned axially outward of the first bearing, and a second clamping component positioned axially outward of the second bearing. The first clamping component includes a complementary thread rotated into engagement with the first thread to reduce an axial distance between the first and second clamping components such that the first and second bearings are clamped therebetween and preloaded against the annular protrusion.

In another aspect, an articulation hitch assembly for coupling a first frame unit to a second frame unit in a ground engaging machine is provided, where the first frame unit includes a first and a second hitch plate defining a first and a second bore, respectively, and the second frame unit includes a middle hitch plate defining a third bore and having an annular protrusion extending inwardly into the third bore, and being positionable between the first and second hitch plates such that the third bore is in register with the first and second bores. The articulation hitch assembly includes a pin defining an articulation axis, and having a first end configured to couple to the first hitch plate, a second end configured to couple to the second hitch plate, and a first thread. A first and a second bearing are positioned about the pin and configured to abut a first and a second axial side of the annular protrusion, respectively. A clamping mechanism having a first clamping component is positioned at a first location axially outward of the first bearing, and a second clamping component is positioned at a second location axially outward of the second bearing. The first clamping component includes a complementary thread engaged with the first thread and being rotatable circumferentially about the articulation axis to decrease an axial distance between the first and second clamping components, such that the first and second bearings are clamped therebetween and preloaded against the annular protrusion when the articulation hitch assembly couples the first frame unit to the second frame unit.

In still another aspect, a method of connecting a first frame unit to a second frame unit via an articulation hitch in a ground engaging machine includes installing a first and a second bearing within a bore defined by a middle hitch plate of the first frame unit, such that the first and second bearings abut opposite sides of an annular protrusion extending inward into the bore. The method further includes positioning the middle hitch plate between an upper and a lower hitch plate of the second frame unit, such that the bore registers with an upper and a lower bore defined by the upper and lower hitch plates, respectively, and rotating a threaded clamping component about a threaded pin defining an articulation axis and being inserted through the registering bores and coupled with each of the upper and lower hitch plates. The method further includes reducing an axial distance between the threaded clamping component and a second clamping component via the step of rotating such that the first and second bearings are clamped therebetween and preloaded against the annular protrusion.

DETAILED DESCRIPTION

Figure 1:
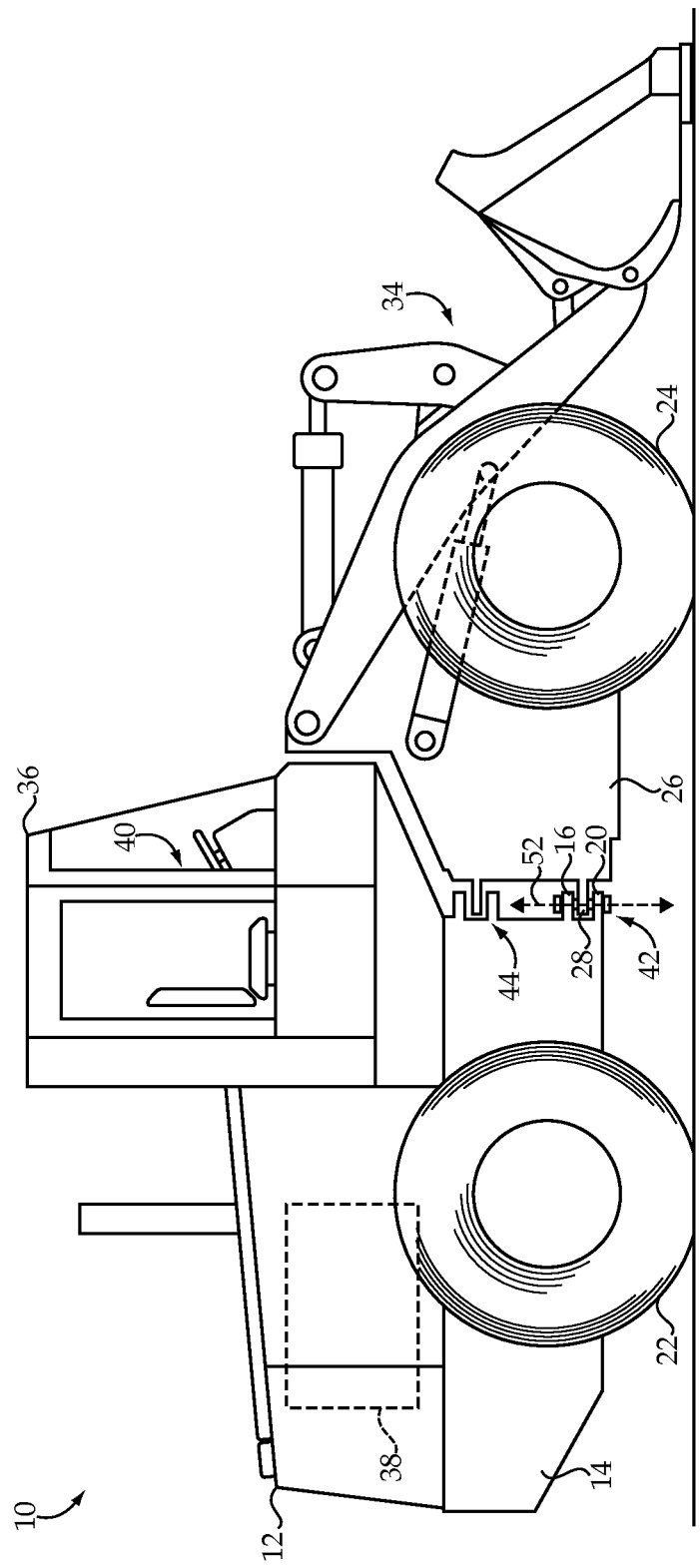
FIG. 1 is a side diagrammatic view of a machine according to one embodiment.

Referring to FIG. 1, there is shown a ground engaging machine 10 according to one embodiment. Machine 10 is shown in the context of an articulated wheel loader having a frame 12 including a first frame unit 14 and a second frame unit 26 coupled to first frame unit 14. A first set of ground engaging elements 22, which may be ground engaging wheels, are coupled to frame unit 26, and a second set of ground engaging elements 24, which may also include ground engaging wheels, are coupled to frame unit 14. An engine 38 may be mounted to frame unit 14, as well as a cab 36 having an operator control station 40 positioned therein in a conventional manner. An implement system 34 including for instance a bucket, lift arms and actuating system, is shown coupled to frame unit 26. Frame unit 14 may further include a first hitch plate 16 and a second hitch plate 20, whereas frame unit 26 may include a middle hitch plate 28 positioned between hitch plates 16 and 20. A first articulation hitch 42 couples frame units 14 and 26 together, and includes a number of different components further described herein. Articulation hitch 42 may include a lower articulation hitch, and a second articulation hitch 44 may be used which includes an upper articulation hitch. As will be further apparent from the following description, articulation hitch 42 may be configured to transmit vertical loads between frame units 14 and 26 during operation. Articulation hitch 44 will typically be configured such that it does not substantially transmit vertical loads between frame units 14 and 26. In alternative embodiments, articulation hitch 42 might be an upper articulation hitch, and articulation hitch 44 might be a lower articulation hitch, with load transmitting duties the opposite of those contemplated for hitches 42 and 44 in machine 10. In still other embodiments both of articulation hitches 42 and 44 might transmit vertical loads, or only a single vertical load transmitting articulation hitch might be used. As will be further apparent from the following description, articulation hitch 42 is contemplated to provide a number of advantages over known articulation hitches, particularly with regard to ease and simplicity of assembly, preloading of bearings further described herein, and load transmission in service. A set of articulation steering actuators will typically be coupled between frame units 14 and 26 but are omitted from FIG. 1. Ground engaging elements 22 and 24 will typically not be configured to rotate relative to their respective frame units for purposes of steering, such that articulation steering provides the sole means of steering machine 10. However, embodiments employing wheel steering in addition to articulation steering, and potentially even wheel steering, alone are contemplated herein.

Figure 2:
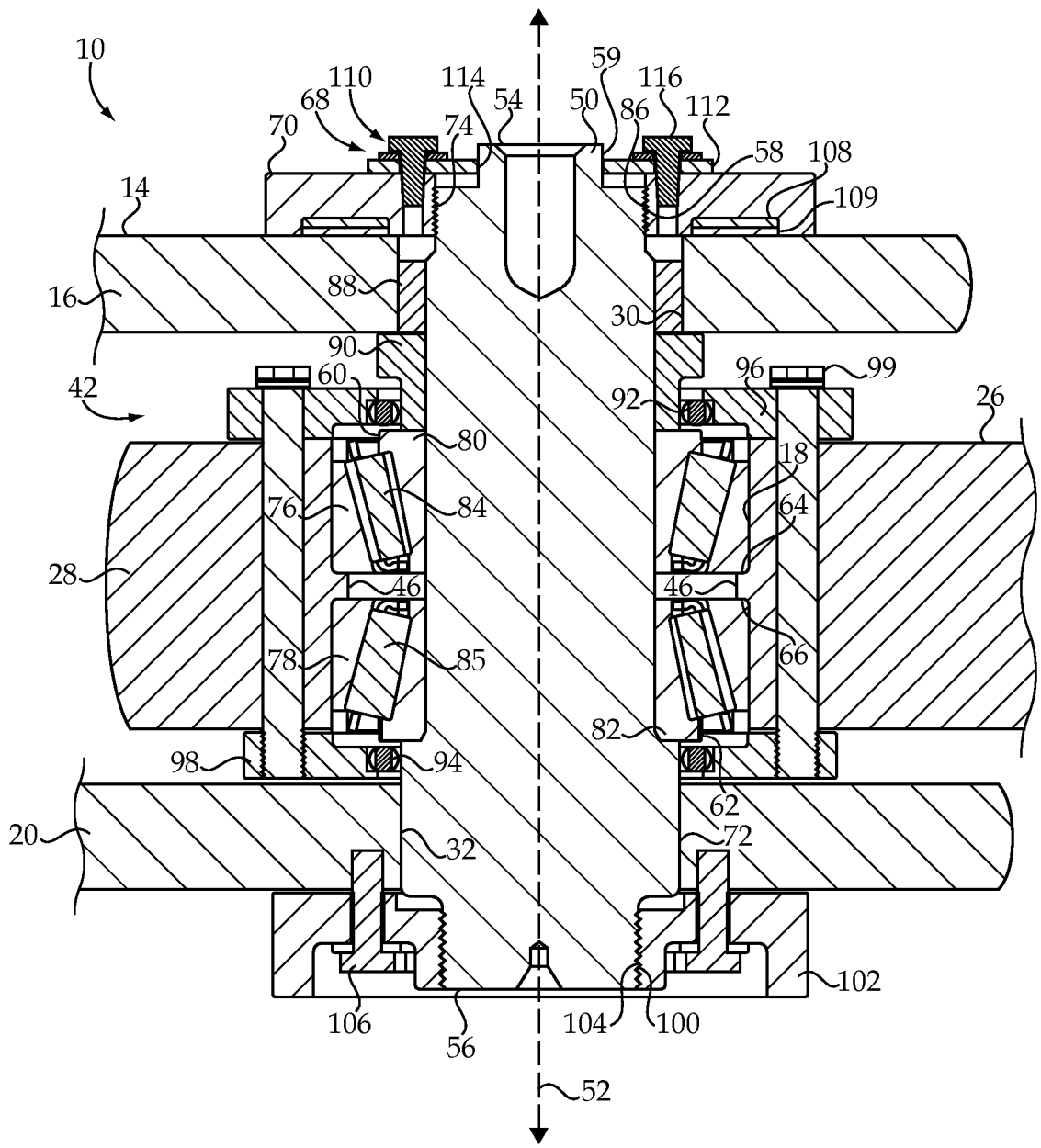
FIG. 2 is a sectioned view through a portion of the machine of FIG. 1.

Referring also now to FIG. 2, as noted above articulation hitch 42 may include a plurality of coupled together components, shown in a sectioned side view in FIG. 2, and thus articulation hitch 42 may be understood as an articulation hitch assembly. As also noted above, frame unit 14, which may be a back frame unit, includes first hitch plate 16 and second hitch plate 20, which may extend in parallel to one another and receive middle hitch plate 28 of second or front frame unit 26 therebetween. First hitch plate 16 may thus be understood as an upper hitch plate, whereas second hitch plate 20 may be understood as a lower hitch plate. In alternative embodiments, an upper and lower hitch plate might be provided on front frame unit 26, and a middle hitch plate provided on back frame unit 14 rather than the practical implementation illustrated in FIG. 2. In the illustrated embodiment, first hitch plate 16 defines a first bore 30 and second hitch plate 20 defines a second bore 32. Middle hitch plate 28 defines a third bore 18 and is positioned such that third bore 18 is in register with first bore 30 and second bore 32. Hitch plate 28 further includes an annular protrusion 46 extending inwardly into third bore 18. Annular protrusion 46 may include a continuous ridge formed integrally with middle hitch plate 28, but in alternative embodiments could include a snap ring or the like held fast within bore 18 via snapping into a groove or the like. In any event, annular protrusion 46 will have a fixed location within bore 18, typically about half way between an upper and a lower axial side of hitch plate 28, such that vertical loads may be transmitted via annular protrusion 46 between hitch plate 28 and hitch plates 16 and 20 via components of articulation hitch 42.

Articulation hitch 42 includes a pin 50 defining an articulation axis 52, and having a first pin end 54 coupled to first hitch plate 16, a second pin end 56 coupled to second hitch plate 20, and a first thread 58. Articulation hitch 42 also includes a first bearing 60 and a second bearing 62 positioned about pin 50 and abutting a first axial side 64 of annular protrusion 46 and a second axial side 66 of annular protrusion 46, respectively. In a practical implementation strategy each of first and second bearings 60 and 62 includes a tapered roller bearing having an outer race 76 and 78, respectively, abutting annular protrusion 46, and an inner race 80 and 82, respectively, positioned upon pin 50. First bearing 60 may include a plurality of rollers 84, and second bearing 62 may include another plurality of rollers 85. First bearing 60 may be oriented such that it has a taper opening toward first hitch plate 16, and second bearing 62 may be oriented such that it has a taper opening toward second hitch plate 20. The respective tapers may be understood to be defined by axes of rotation of each of the sets of rollers 84 and 85.

Articulation hitch 42 further includes a clamping mechanism 68 having a first clamping component 70 positioned at a first location axially outward of first bearing 60, and a second clamping component 72 positioned at a second location axially outward of second bearing 62. First clamping component 70 includes a complementary thread 74 engaged with first thread 58 and being rotatable circumferentially about articulation axis 52. Rotation of first clamping component 70 in a first direction decreases an axial distance between first and second clamping components 70 and 72 such that first and second bearings 60 and 62 are clamped therebetween and preloaded against annular protrusion 46 when articulation hitch 42 couples frame unit 14 to frame unit 26. Rotation in an opposite direction would increase the axial distance. In one embodiment, first clamping component 70 includes an end cap, and complementary thread 74 includes an internal thread within a bore 86 formed in the end cap. Second clamping component 72 may include a shoulder formed on pin 50. Clamping mechanism 68 may further include a plurality of spacers 88 and 90 positioned about pin 50 at a location axially between first clamping component 70 and first bearing 60. Pin 50 may further include a second external thread 100, and articulation hitch 42 may further include a second end cap 102 having a second internal thread 104 engaged with second external thread 100. A plurality of bolts 106 may pass through second end cap 102 and couple pin 50 to hitch plate 20, such that vertical loads are shared between hitch plates 16 and 20 as further described herein. Articulation hitch 42 may further include a first bearing seal 92 positioned about pin 50 and a second bearing seal 94 also positioned about pin 50, at locations axially outward of first and second bearings 60 and 62, respectively, and a first sealing cap 96 and a second sealing cap 98 positioned axially outward of first and second bearing seals 92 and 94, respectively. Sealing caps 96 and 98 may compress seals 92 and 94, respectively, against inner races 80 and 82 of bearings 60 and 62, respectively, to form a sealed space containing lubricating oil within bearings 60 and 62.

Articulation hitch 42 still further may include a locking mechanism 110 coupled to first end 54 of pin 50 and to first clamping component or end cap 70 and inhibiting rotation of pin 50 relative thereto. Pin 50 may also include an outer surface 59 having a polygonal shape for engaging with a wrench or the like, the significance of which will be apparent from the following description. In one practical implementation strategy, locking mechanism 110 may include a plate 112 having an aperture 114 formed therein which mates with the polygonal shaped part of outer surface 59. A plurality of bolts 116 may extend into clamping component or end cap 70 to attach plate 112 in a manner also further apparent from the following description. A first annular spring 109 and a second annular spring 108, which might include Belleville™ springs or the like, may be clamped between clamping component 70 and first hitch plate 16 such that springs 108 and 109 are held in compression.

Figure 3:
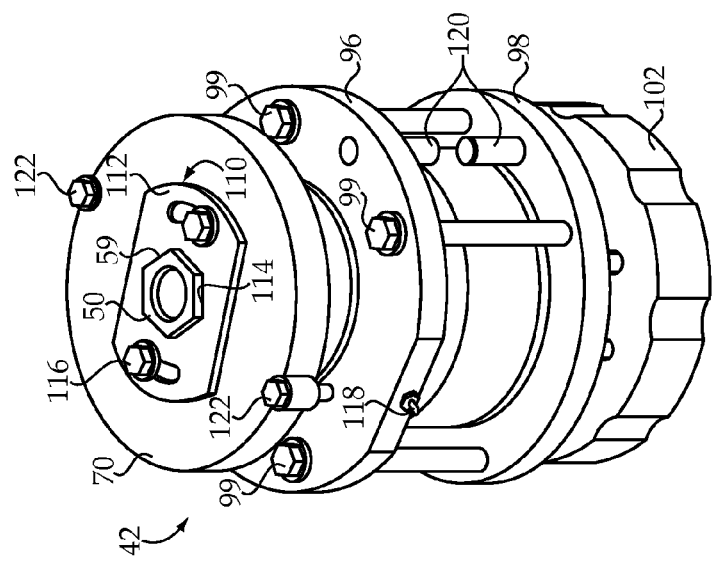
FIG. 3 is a diagrammatic view of an articulation hitch assembly suitable for use in the machine of FIG. 1.

Referring also now to FIG. 3, there is shown a diagrammatic view of articulation hitch 42 illustrating the various components in an assembled state but not coupled to frame units 14 and 26. As mentioned above, outer surface 59 may have a polygonal shape. In other embodiments, pin 50 could have a polygonal shaped surface within a bore. A wrench or other suitable tool for applying a torque may thus be coupled with pin 50 enabling rotation of pin 50 a desired degree, then locking mechanism 110 may be coupled to pin 50, and plate 112 bolted via bolts 116 to clamping component 70. Additional bolts 122 may be provided which attach clamping component 70 at a fixed angular orientation to hitch plate 16. Also shown in FIG. 3 are spring pins 120 which may be used in assembly of articulation hitch 42 as further described herein. A plug 118 positioned in sealing cap 96 is also visible in FIG. 3, and can seal a bore extending radially through sealing cap 96 for supplying lubricating oil into the fluidly sealed space containing bearings 60 and 62 between seals 92 and 94.

INDUSTRIAL APPLICABILITY

Figure 4:
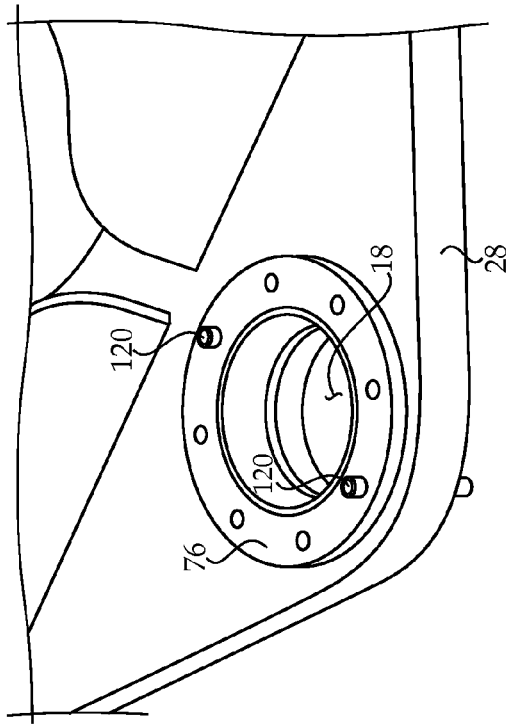
FIG. 4 is a diagrammatic view at one stage of an assembly procedure for an articulation hitch assembly, according to one embodiment.

Referring to the drawings generally, but in particular now to FIG. 4, there is shown middle hitch plate 28, with certain components of articulation hitch 42 coupled therewith. At the state depicted in FIG. 4, outer race 76, which may be understood as a bearing cup, and two spring pins 120 have been coupled with middle hitch plate 28, such as via interference fitting outer race 76 within bore 18. The counterpart outer race/cup 78 may be pressed into bore 18 from an opposite side of middle hitch plate 28. An outer annular ring 77 may be coupled with or part of hitch plate 28 and surrounds bore 18, and a similar ring might be positioned upon the side of hitch plate 28 not visible in FIG. 4.

Figure 5:
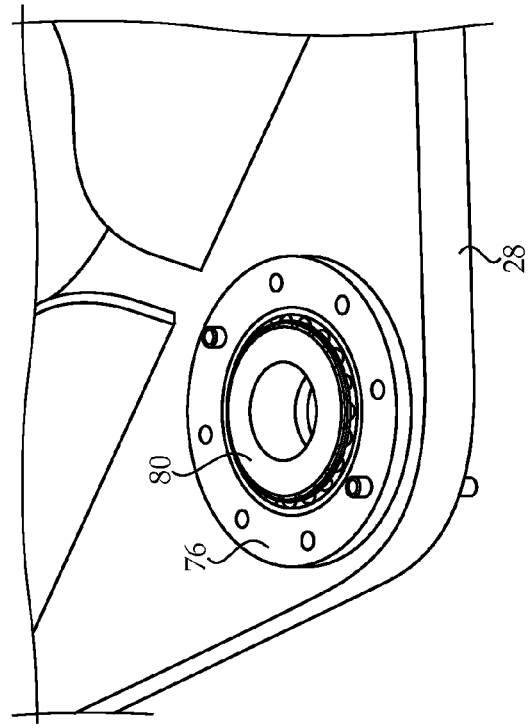
FIG. 5 is a diagrammatic view at another stage of the assembly procedure.
Figure 6:
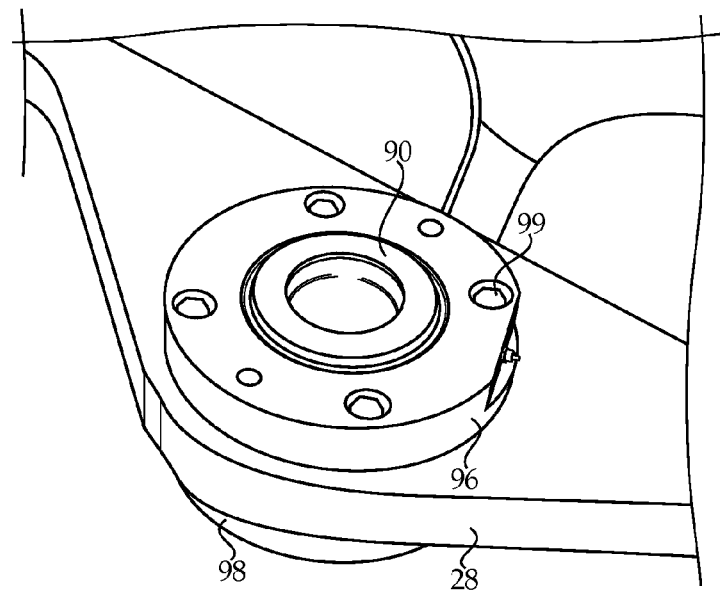
FIG. 6 is a diagrammatic view at yet another stage of the assembly procedure.

In FIG. 5, inner race 80 and the corresponding rollers, generally referred to in the art as a "cone," have been placed upon outer race/cup 76. Although obscured, in FIG. 6 seal 72 and an accompanying fitting has been positioned in sealing cap 96. Cap 96 has been pressed onto the spring pins now hidden from view. Spacer 90, and potentially an additional annular spring or the like (not shown) has been placed partially within end cap 96 and positioned upon inner race 80. Bolts 99 extend through cap 96 and have been engaged with sealing cap 98 positioned on an opposite side of middle hitch plate 28, along with the corresponding seal.

Figure 7:
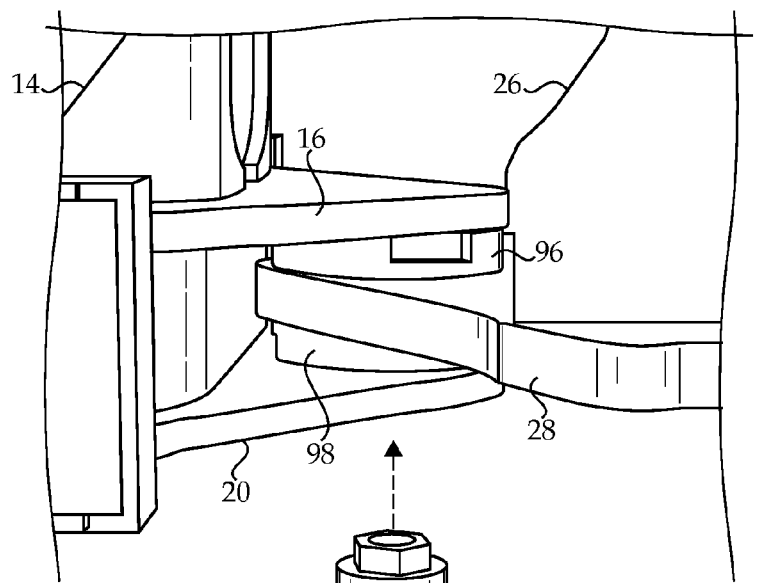
FIG. 7 is a diagrammatic view at yet another stage of the assembly procedure.
Figure 7:
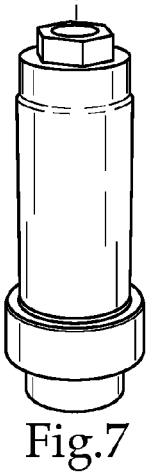
Figure 8:
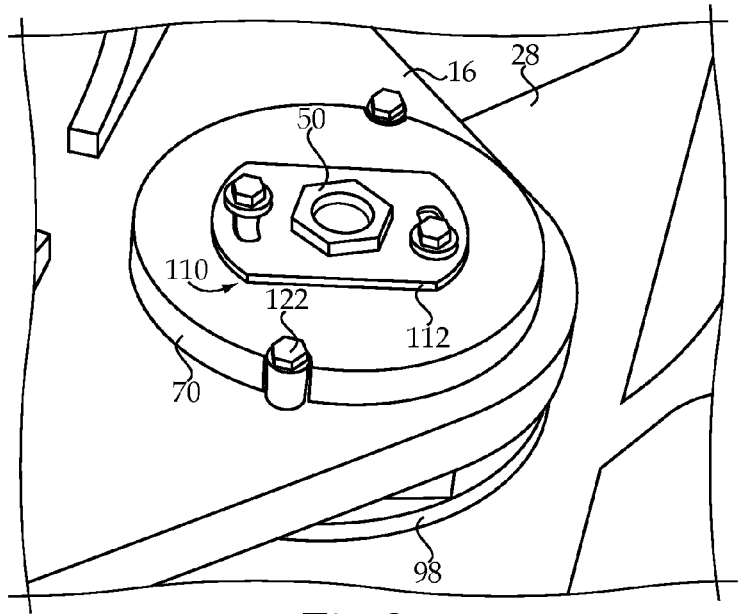
FIG. 8 is a diagrammatic view at yet another stage of the assembly procedure.

In FIG. 7, frame units 14 and 26 are shown in side view, and pin 50 is shown as it might appear just prior to being inserted from below. Bearings 60 and 62 are installed but not yet preloaded. Clearances between pin 50 and inner races 80 and 82 may be sufficiently tight that a press or puller will be used to bring pin through the registering bores, bearings and other now assembled components. In FIG. 8, pin 50 is shown extending through the assembled components and hitch plates, and locked against rotation relative to the now installed clamping component 70 as well as hitch plate 16. Springs 108 and 109 will have been installed between component 70 and hitch plate 16. To reach the assembly stage depicted in FIG. 8, component 70 may be spun on by hand, threadedly engaging pin 50 until it touches off on spring 108, and then counter-spun so that bolts 112 and optionally spacers between bolts 112 and hitch plate 16 can be installed and coupled with hitch plate 16. Locking mechanism 110 has not yet been coupled with pin 50. Pin 50 may then be rotated via a prescribed torque, causing bearings 60 and 62 to be clamped against annular protrusion 46 and thereby preloaded. At the same time that pin 50 is rotated to preload bearing 60 and 62, a vertical load transmission path between hitch plate 28 and hitch plates 16 and 20 is established. In a practical implementation strategy, the vertical load transmission path may extend from annular protrusion 46 in opposite directions into bearings 60 and 62, then into shoulder 72 and spacer 90, thenceforth from spacer 90 into hitch plate 16 and from shoulder 72 into cap 102 and thenceforth hitch plate 20.

It may be noted that neither sealing caps 96 or 98, nor bolts 99 are in the vertical load transmission path. This feature is believed advantageous over known designs, where bolts somewhat analogous to bolts 99 were used to preload tapered roller bearings, and simultaneously clamp seals about the tapered roller bearings in an articulation hitch. In such earlier designs, establishment of vertical load transmission paths and preloading tapered roller bearings were merged and, accordingly, in such systems shims were often needed to balance these functions and compensate for manufacturing tolerances. Shim pack installation tended to require multiple iterative steps, and was very time consuming. By also providing for a second threaded end of pin 50, that end engaged with cap 102, a solid connection between pin 50 and hitch plate 20 is established, and also without any need for shimming. It may be noted that no shims are needed in articulation hitch 42 at all.

Figure 9:
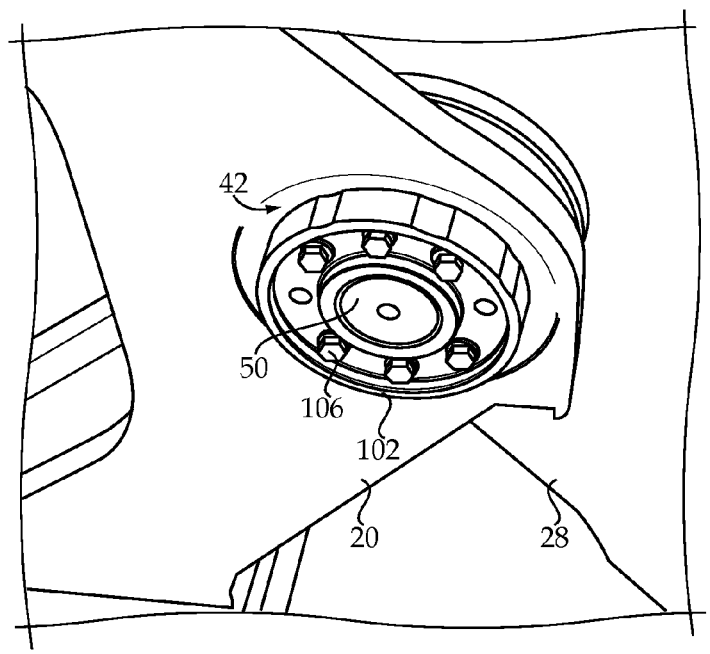
FIG. 9 is a diagrammatic view at yet another stage of the assembly procedure.

Once pin 50 is torqued as desired, bearing preload and vertical load transmission paths established, locking mechanism 110 may be used in the manner described herein to fix the angular orientation of pin 50 and component 70. In FIG. 9, a final assembly state of articulation hitch is depicted. To reach the stage shown in FIG. 9, cap 102 may be spun on, engaged with pin 50, until it touches off on hitch plate 20, and then backed off just enough to align the appropriate bolt holes for bolts 106. Bolts 106 may then be inserted and a prescribed torque applied to complete assembly of articulation hitch 42.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A ground engaging machine comprising:
    a frame including a first frame unit having a first and a second hitch plate defining a first and a second bore, respectively, and a second frame unit having a middle hitch plate positioned between the first and second hitch plates and defining a third bore in register with the first and second bores, and including an annular protrusion extending inwardly into the third bore;
    an articulation hitch coupling the first and second frame units together, and including a pin defining an articulation axis, and a first and a second bearing, the first and second bearings each including a tapered roller bearing having an inner race, an outer race and a plurality of rollers between the inner and outer races, and being positioned about the pin and abutting a first and a second axial side of the annular protrusion, respectively;
    the pin having a first end coupled to the first hitch plate, a second end coupled to the second hitch plate, and a first thread;
    the articulation hitch further including a clamping mechanism having a first clamping component positioned axially outward of the first bearing, and a second clamping component positioned axially outward of the second bearing and including a shoulder formed on the pin, and a spacer positioned about the pin and located axially between the first clamping component and the first bearing; and
    the first clamping component including a complementary thread rotated into engagement with the first thread to reduce an axial distance between the first and second clamping components such that the first and second bearings are clamped between the shoulder and the spacer and preloaded against the annular protrusion via a preload applied by the clamping to both the inner and outer races and the rollers in each of the first and second bearings.

2. The machine of claim 1 wherein the middle hitch plate includes an upper and a lower axial side, and the annular protrusion is formed integrally with the middle hitch plate between the upper and lower axial sides.

3. The machine of claim 2 wherein each of the first and second bearings has an outer race abutting the annular protrusion, and an inner race positioned upon the pin, and wherein the first bearing has a taper opening toward the first hitch plate and the second bearing has a taper opening toward the second hitch plate.

4. The machine of claim 2 wherein the first thread includes an external thread formed on the first end of the pin, and the complementary thread includes an internal thread formed in a bore defined by the first clamping component.

5. The machine of claim 4 wherein the first clamping component includes an end cap.

6. The machine of claim 5 wherein the first hitch plate is positioned axially between the first clamping component and the first bearing, and the spacer is positioned axially between the first hitch plate and the first bearing and contacts each of the same.

7. The machine of claim 6 further comprising a spring held in compression between the first clamping component and the first hitch plate.

8. The machine of claim 6 further comprising a locking mechanism coupled to the pin and to the first clamping component and inhibiting rotation of the pin relative thereto.

9. The machine of claim 5 wherein the pin further includes a second external thread, and the articulation hitch further includes a second end cap having a second complementary thread rotated into engagement with the second external thread and coupling the pin to the second hitch plate.

10. The machine of claim 9 further comprising:
    a first and a second bearing seal positioned about the pin at locations axially between the first and second bearings and the first and second hitch plates, respectively; and
    a first and a second sealing cap positioned axially outward of the first and second bearing seals, respectively, and each holding the corresponding bearing seal in compression via a plurality of bolts clamping the first and second sealing caps to the middle hitch plate.

11. The machine of claim 2 wherein the articulation hitch includes a lower articulation hitch, and further comprising a first plurality of ground engaging wheels coupled with the first frame unit, a second plurality of ground engaging wheels coupled with the second frame unit, and an upper articulation hitch coupling the first and second frame units together.

12. An articulation hitch assembly for coupling a first frame unit to a second frame unit in a ground engaging machine, where the first frame unit includes a first and a second hitch plate defining a first and a second bore, respectively, and the second frame unit includes a middle hitch plate defining a third bore and having an annular protrusion extending inwardly into the third bore, and being positionable between the first and second hitch plates such that the third bore is in register with the first and second bores, the articulation hitch assembly comprising:
    a pin defining an articulation axis, and having a first end configured to couple to the first hitch plate, a second end configured to couple to the second hitch plate, and a first thread;
    a first and a second bearing positioned about the pin and being configured to abut a first and a second axial side of the annular protrusion, respectively; and
    a clamping mechanism having a first clamping component positioned at a first location axially outward of the first bearing, and a second clamping component positioned at a second location axially outward of the second bearing; and
    the first clamping component including a complementary thread engaged with the first thread and being rotatable circumferentially about the articulation axis to decrease an axial distance between the first and second clamping components, such that the first and second bearings are clamped therebetween and preloaded against the annular protrusion when the articulation hitch assembly couples the first frame unit to the second frame unit;
    wherein the first clamping component includes an end cap and the complementary thread includes an internal thread within a bore formed in the end cap, and the second clamping component includes a shoulder formed on the pin.

13. The assembly of claim 12 wherein the clamping mechanism further includes a plurality of spacers positioned about the pin at a location axially between the first clamping component and the first bearing.

14. The assembly of claim 13 further comprising a first and a second bearing seal positioned about the pin at locations axially outward of the first and second bearings, respectively, and a first and a second sealing cap positioned axially outward of the first and second bearing seals, respectively.

15. The assembly of claim 14 wherein the pin further includes a second external thread, and further comprising a second end cap having a second internal thread engaged with the second external thread.

16. The assembly of claim 15 wherein each of the first and second bearings includes a tapered roller bearing positioned upon the pin such that the first bearing has a taper opening toward the first end cap and the second bearing has a taper opening toward the second end cap.

17. The assembly of claim 12 further comprising a locking mechanism coupled to the first end of the pin and to the end cap and inhibiting rotation of the pin relative to the end cap, and wherein the first end of the pin includes an outer surface having a polygonal shape.

18. A method of connecting a first frame unit to a second frame unit via an articulation hitch in a ground engaging machine comprising the steps of:

installing a first and a second bearing within a bore defined by a middle hitch plate of the first frame unit, such that the first and second bearings abut opposite sides of an annular protrusion extending inwardly into the bore;

positioning the middle hitch plate between an upper and a lower hitch plate of the second frame unit, such that the bore registers with an upper and a lower bore defined by the upper and lower hitch plates, respectively;

rotating a threaded clamping component about a threaded pin defining an articulation axis and being inserted through the registering bores and coupled with each of the upper and lower hitch plates; and reducing an axial distance between the threaded clamping component and a second clamping component via the step of rotating such that the first and second bearings are clamped therebetween and preloaded against the annular protrusion;

wherein the step of rotating includes rotating an end cap comprising the threaded clamping component, and the step of reducing further includes reducing the axial distance between the end cap and a shoulder formed on the pin and comprising the second clamping component.

* * * * *